(12) United States Patent
Nemoto et al.

(10) Patent No.: US 7,152,924 B1
(45) Date of Patent: Dec. 26, 2006

(54) UNLOCKING MECHANISM OF RECLINING DEVICE FOR SEAT

(75) Inventors: Akira Nemoto, Akishima (JP); Tomohisa Kubota, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 11/413,081

(22) Filed: Apr. 28, 2006

(51) Int. Cl.
*B60N 2/20* (2006.01)

(52) U.S. Cl. ................................. 297/378.12

(58) Field of Classification Search ............. 297/378.1, 297/378.12
See application file for complete search history.

(56) References Cited

U.S. PATENT DOCUMENTS

| | | | | |
|---|---|---|---|---|
| 6,152,533 | A * | 11/2000 | Smuk ..................... | 297/378.12 |
| 6,336,679 | B1 * | 1/2002 | Smuk ..................... | 297/378.12 |
| 6,659,557 | B1 * | 12/2003 | Deptolla .................... | 297/367 |
| 6,739,668 | B1 * | 5/2004 | Coman et al. .......... | 297/378.12 |
| 6,863,347 | B1 * | 3/2005 | De Nichillo ........... | 297/378.12 |
| 2002/0125757 | A1 * | 9/2002 | LeTournoux ........... | 297/378.12 |
| 2006/0170270 | A1 * | 8/2006 | Inoue et al. ........... | 297/378.12 |

FOREIGN PATENT DOCUMENTS

JP          2005-052170          3/2005

* cited by examiner

*Primary Examiner*—Peter R. Brown
(74) *Attorney, Agent, or Firm*—Browdy and Neimark, PLLC

(57) ABSTRACT

Unlocking mechanism of reclining device features an angularly movable stabilizer link mechanism of four-point articulated link structure which comprises a first link member connected with a remote lock control device, a second link member and a third link member. The second link member is pivotally connected with a shaft of the reclining device and one end of the first link member. The third link member is pivotally connected with seat back side and another end of the first link member. With inclination of seat back, the second and third link members are moved angularly relative to the reclining device shaft so as to retain the first link member at fixed horizontal position. Operation of the remote lock control device causes rotation of the first link member away from such fixed horizontal position, thereby causing rotation of the shaft to unlock the reclining device, irrespective of the inclination of seat back.

4 Claims, 2 Drawing Sheets

UNLOCKING MECHANISM OF RECLINING DEVICE FOR SEAT

BACKGROUND OF THE INVENTION

1. Field of the Invention

The present invention relates to an unlocking mechanism provided in a reclining device for allowing a seat back of seat to be adjustably inclined. In particular, the invention is directed to the unlocking mechanism of this kind which is remotely operable by a lever disposed on an upper portion of the seat back.

2. Description of Prior Art

There has been made available various kinds of reclinable seats for vehicles, each of which is normally provided with a reclining device for allowing a seat back thereof to be adjustably inclined.

Irrespective of such reclining action, it is frequently necessary to incline the seat back to a desired position or to fold down the seat back onto a seat cushion into a full flat state, and, in some cases, it is necessary to displace a seat back of front seat forwardly to a so-called "walk-in" position which allows a passenger to climb onto or descend from a rear seat without interference with the front seat. For that purpose, as typically disclosed from the Japanese Laid-Open Patent Publication No. 2005-52170, a remotely controllable type of unlocking mechanism is provided in the top area of seat back to allow for releasing the seat back from a locked state caused by the reclining device, and further, an angular change mechanism is provided between that particular unlocking mechanism and a driving shaft of the reclining device.

In brief, according to the foregoing Japanese publication, an unlocking lever is provided in the top area of seat back, from which a sheathed wire cable extends to the reclining device, as a transmission means, so that an operation by the unlocking lever will be transmitted through the wire cable to the reclining device, to thereby unlock the seat back from the reclining device. In this prior art, three bevel gears, arm and spring are operatively connected between the wire cable and the driving shaft of reclining device, as an angular adjustment mechanism for causing the seat back to incline adjustingly to a desired angle, independently of the reclining device.

However, such prior-art unlocking mechanism involves the following problems: i) the three bevel gears are meshed with one another in a three-dimensionally massive manner, which is not only quite complicated in structure, but also increases a whole size of the mechanism that may impair a cushion quality of padding potions adjacent to the bevel gears, and ii) the provision of three bevel gears and spring in the transmission system apparently causes a loss in transmission efficiency and therefore can not provide a sufficient and quick transmission of operation to the driving shaft of reclining device, as a result of which, it is impossible to attain a precise and quick responsive operationability for the remotely controlled unlocking action of the reclining device.

SUMMARY OF THE INVENTION

In view of the above-stated drawbacks, it is a purpose of the present invention to provide an improved unlocking mechanism for a reclining device of remotely controlled type, which is small in size and simplified in structure, while insuring direct and precise transmission of operation force given from a remote lock control device to the reclining device, irrespective of inclination of seat back of seat.

In order to achieve such purpose, in accordance with the present invention, an unlocking mechanism of this kind is basically comprised of:

- an angularly movable stabilizer link mechanism of a four-point articulated link structure having four pivotal points therein, which is movable angularly relative to a shaft of the reclining device in conjunction with inclination of a seat back so as to stably maintain a fixed transmission passage for allowing an operation force from a remote lock control device to be directly transmitted therethrough to the shaft, irrespective of the inclination of seat back; and
- a lever piece fixed to the shaft;
- the angularly movable stabilizer link mechanism essentially consisting of:
  - a first link element having one end, another end, and a central portion defined between those one and another ends;
  - a guide means for guiding the first link element in a vertical direction of the seat back, the guide means being fixedly connected with a part of said seat back, while being pivotally connected with the central portion of the first link element as well as with an end of the wire cable means;
  - an second link element having: one end pivotally connected with the said one end of the first link element, thus forming a first pivotal point of the four pivotal points; and another end pivotally connected with the lever piece, thus forming a second pivotal point of the four pivotal points; and
  - a third link element having: one end pivotally connected with the afore-said another end of first link element, thus forming a third pivotal point of the four pivotal points; and another end pivotally connected with a part of the seat cushion, thus forming a fourth pivotal point of the four pivotal points,
- wherein the first link element is movable angularly relative to the shaft in conjunction with inclination of the seat back, while being retained at a fixed horizontal position by the second and third link elements, and wherein operation of the remote control device causes upward movement of the wire cable means, thereby causing rotation of the first link element relative to the third pivotal point in a direction away from the fixed horizontal position, which in turn causes rotation of the driving shaft via the lever piece to unlock the reclining device, irrespective of the inclination of the seat back.

Preferably, the wire cable means may comprise a sheathed wire cable comprising a sheath member and a wire cable slidably extending in and through the sheath member, in which case, one end of the wire cable may be fixed to the remote lock control device, while another end of the wire cable correspond to an end of the wire cable means. The guide means may include an elongated hole and a guide pin slidably fitted in the elongated hole, and the central portion of first link element and another end of said wire cable may be pivotally connected with the guide pin.

In the case where the seat back has a seat back frame provided therein, the seat back frame including at least one side frame member having a width extending in a direction forwardly and backwardly of the seat, it is then preferable that the first link element has a whole length smaller than the width of such at least one side frame member, and that the lever piece as well as the first, second and third link elements are formed from a plate material and further extend to and along the at least one side frame member.

Other features and advantages of the present invention will become apparent from the description hereinafter, with reference to the annexed drawings.

DETAILED DESCRIPTION OF PREFERRED EMBODIMENT OF THE INVENTION

Figure 1:
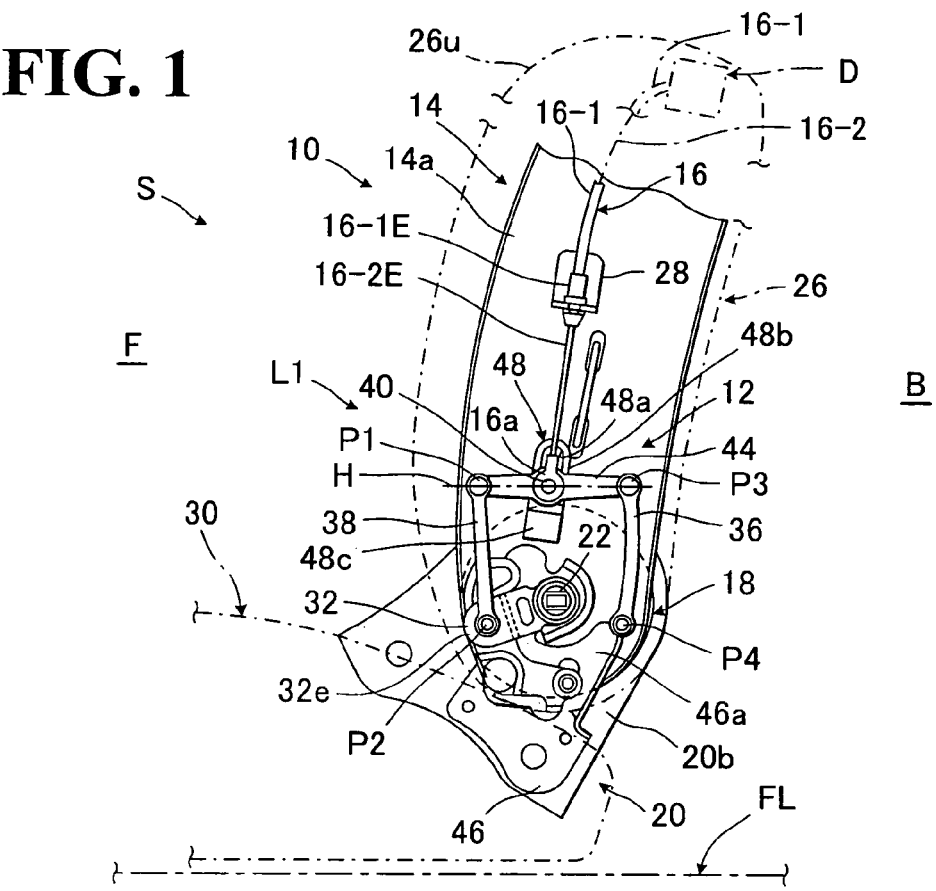
FIG. 1 is a partly broken schematic front view of an unlocking mechanism of reclining device in accordance with the present invention, which shows a locked state of the reclining device.

Referring to FIGS. 1 to 4, there is illustrated a preferred embodiment of unlocking mechanism of the present invention, as generally designated by (10), which is operable for unlocking a reclining device (18).

Designations (26) and (30) respectively denote a seat back and a seat cushion, which typically form a vehicle seat (S) to which is applied the unlocking mechanism (10) of the present invention to be described later.

It is noted that, hereinafter, the term, "forward" or "forwardly, refers to a side forwardly of the seat (S), whereas the term "backward" or "backwardly", refers to a side backwardly of the seat (S).

As indicated by the one-dot chain lines, the seat back (26) is formed by upholstering a seat back frame generally designated by (14), whereas the seat cushion (30) is also formed by upholstering a seat cushion frame generally designated by (20), as known in the art. Designation (14a) denotes one lateral frame member of the seat back frame (14). In this respect, it is noted that the seat back frame (14), as generally known in the art, has a pair of lateral frame members each being connected via the reclining device (18) with a backward end portion (20b) of the seat cushion frame (20), and therefore, such lateral frame member (14a) is one of those particular pair of lateral frame members.

The seat back frame (14) is at a lower end portion thereof operatively connected via the reclining device (18) with the backward end portion (20b) of the seat cushion frame (20), so that the seat back frame (14) or the seat back (26) can be adjustably inclined by the reclining device (18) with respect to the seat cushion frame (20) or the seat cushion (30).

The illustrated reclining device (18) is the so-called "round reclining device" of circular configuration, as known for example from the Japanese Laid-Open Patent Publication No. 2-228914. In brief, while not shown, this sort of reclining device basically comprises; a circular base plate having a shaft (22) at the center thereof; circular rotary plate rotatably coupled to that circular base plate; and a lock/unlock mechanism operatively connected with the shaft (22), which may be actuated by rotation of that particular shaft (22), such that rotation of the shaft (22) in a locking direction results in locking the circular rotary plate to a given inclination angle, whereas rotation of the shaft (22) in an unlocking direction results in unlocking that circular rotary plate therefrom for free rotation about a center of the shaft (22). The circular base plate of the reclining device may be fixed to a backward end portion (20b) of seat cushion frame (20), and the circular rotary plate be fixed to a lower end potion of seat back frame (14). Detailed structure and action of such round reclining device are described specifically in the foregoing Pub. No. 2-228914. As this is not the subject matter of the present invention, further description thereon is omitted for simplicity.

As with the conventional reclining system, the shaft (22) of the foregoing reclining device (18) is operatively connected with a remote lock control device (D) disposed on a shoulder area of the top portion (26u) of seat back (26), as indicated by the one-dot chain lines in FIG. 1. Conventionally, a known transmission system stated in the description of prior art is provided between the shaft (22) of reclining device (18) and the remote lock control device (D). Hence, the reclining device (18) may be remotely unlocked by operation of this sort of lock control device (D) located at the seat back top region (26u).

In general, the remote lock control device (D) may be a rotary-type lock control device wherein a rotary lever element can be rotated to an unlocking position, as disclosed from the Japanese Laid-Open Patent Publication No. 2005-52170 for instance. Or, alternatively, the lock control device (D) may be of such a type having a slide knob that is slidably movable to an unlocking position. In any case, a suitable remote lock control device may be provided at a given position on the top region (26u) of seat back (26). Normally, as roughly understandable from FIG. 1, this sort of remote lock control device (D) is provided with a sheathed wire cable (16) as a transmission means for operative connection with the shaft (22) of reclining device (18). As is known, the sheathed wire cable (16) itself is flexible and basically formed by a sheath member (16-1) of elastic property and a flexible wire cable (16-2) slidably extending in and through that sheath member (16-1). An upper end of the wire cable (16-2) is connected with the remote lock control device (D).

With the foregoing known seat reclining arrangement, it is to be generally understood that operation of the remote lock control device (D) releases the reclining device (D) from the locked state, thereby allowing the seat back frame (14) or seat back (26) to be adjustably inclined to a desired inclination angle with respect to the seat cushion frame (20) or seat cushion (30) by operation of the reclining device (18).

Now, in accordance with the present invention, provided in the above-described seat reclining arrangement is an angularly movable stabilizer link mechanism (12) of four-point articulated link structure, which is movable angularly relative to the shaft (22) of reclining device (18) in conjunction with forward and backward inclination of the seat back frame (14) so as to stably retain a fixed transmission passage for allowing an operation force from the remote lock control device (D) to be directly transmitted to the reclining device shaft (22), irrespective of the forward and backward inclination of the seat back frame (14).

As illustrated, the angularly movable stabilizer link mechanism (12) is basically comprised of an actuator link member (38), a support link member (36), and a connecting link member (44), so as to form a four-point articulation link structure as will be described later. All those link members (38), (36) and (44) are formed from a flat plate material with a view to making thin a substantially cross-sectional thickness of a whole of the angularly movable stabilizer link mechanism (12), wherein such substantially cross-sectional thickness is defined as a thickness of that whole of link mechanism (12) which extends transversely of the side frame member (14a) of seat cushion frame (14).

Designation (32) denotes a lever piece fixed to the aforesaid shaft (22) of reclining device (18). It is noted that the lever piece (32) extends from the shaft (22) and terminates in a free end (32e) within the planar area of the side frame member (14a), as shown.

Further, as illustrated, the connecting link member (44) has a whole length smaller than the width of the side frame member (14a) and is pivotally connected, at the center thereof, with a guide pin (40), such that the whole length of connecting link member (44) extends horizontally within the width of side frame member (14a) in a direction transversely of the latter.

The guide pin (40) is slidably fitted in a vertically elongated hole (48a) formed in a guide main portion (48b) of guide support member (48). The guide support member (48) is fixed at the securing end (48c) thereof to the side frame member (14a) as by welding, such that the guide main portion (48b) thereof extends along and in a close proximity to the planar surface of side frame member (14a).

Further, connected with the foregoing guide pin (40) is a securing end portion (16a) of wire cable (16-2) associated with the aforementioned sheathed wire cable (16).

In this regard, as shown, the lower end portion of the sheathed wire cable (16) is so formed to have, defined therein, a lower end (16-1E) of the sheath member (16-1) which faces to the connecting link member (44); and an exposed wire portion (16-2E) extending from that lower end (16-1E) of sheath member (16-1) to the foregoing guide pin (40). The sheath member lower end (16-1E) is securely supported by a bracket (28) fixed to the seat back lateral frame member (14a). On the other hand, the exposed wire portion (16-2E) terminates in the afore-said securing end portion (16a) which is fixed to the guide pin (40). Hence, the vertical movement of the wire cable (16-2) through the sheath member (16-1) causes simultaneous vertical displacement of the connecting link member (44) along the elongated hole (48a) of guide support member (48).

As viewed from FIG. 1, the actuator link member (38) is pivotally connected between a left-side end of the afore-said horizontal connecting link member (44) and the free end (32e) of lever piece (32). Specifically, the actuator link member (38) is at the upper end thereof pivotally connected via a first pin (P1) with the left-side end of connecting link member (44), while being at the lower end thereof pivotally connected via a second pin (P2) with the lever piece free end (32e). It is therefore observed that a whole of the actuator link member (38) is disposed within the width of the side frame member (14a).

As also viewed from FIG. 1, the support link member (36) is at the upper end thereof pivotally connected via a third pin (P3) with a right-side end of the connecting link member (44), while being at the lower end thereof pivotally connected via a fourth pin (P4) with an upper end portion (46a) of bracket (46) fixed to the backward end portion (20b) of the seat cushion frame (20), such that a whole of the support link member (36) is disposed within the width of the side frame member (14a). As shown in the FIG. 1, it is essential that both actuator link member (38) and support link member (36) are substantially equal in whole length to each other, and that both two lower ends respectively of those two link members (38) (36) are disposed on the same level with each other at their respective pivotal points (at P2) (at P4), while likewise, both upper two ends respectively of the two link members (38) (36) are disposed on the same level with each other at their respective pivotal points (at P1) (at P3), when the lever piece (32) is positioned at a locked point as in FIG. 1, thereby normally retaining the connecting lever member (44) in a substantially parallel relation with the flat floor (FL) of vehicle. In other words, whenever the reclining device (18) is in an unlocked state, the connecting link member (44) is retained by the actuator and support link members (38) (36) in the state of extending along a horizontal line (H) in a substantially parallel relation with the floor (FL).

Figure 2:
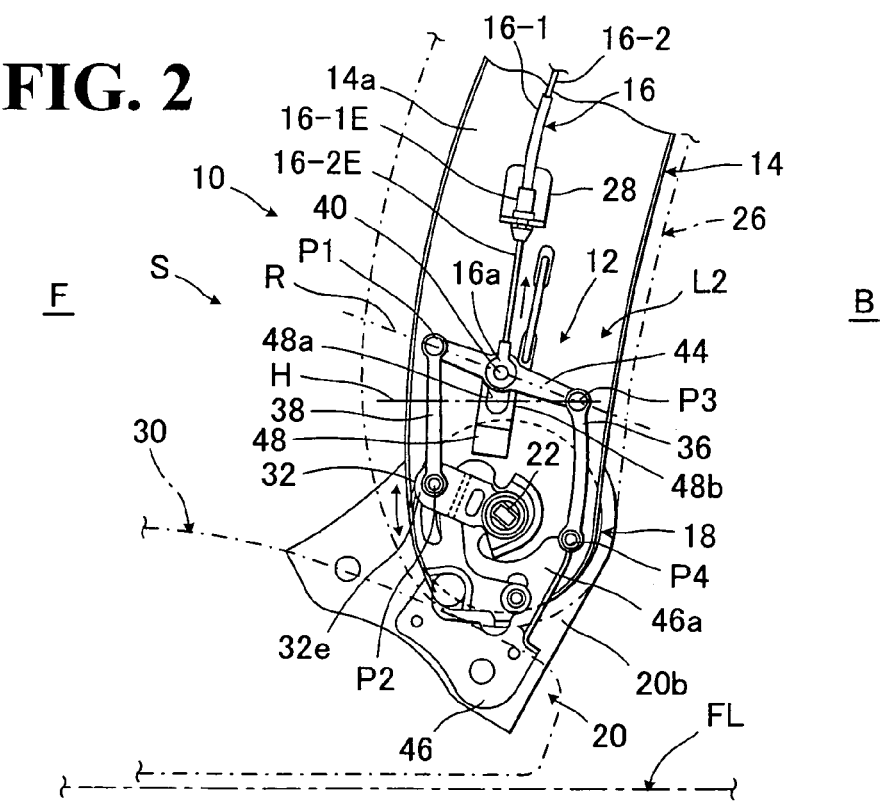
FIG. 2 is a partly broken schematic front view of the unlocking mechanism of reclining device, which shows an unlocked state of the reclining device.

With the above-described arrangement, when the remote lock control device (D) is operated to an unlock position, the wire cable (16-2) is drawn upwardly through the sheath member (16-1), which causes simultaneous upward movement of the slide pin (40) along the elongated hole (48a), with the result that, as shown in FIG. 2, the connecting link member (44) is rotated clockwise relative to the third pivotal point (at P3) of the support link member (36), thereby causing simultaneous upward displacement of the actuator link member (38) and also causing simultaneous clockwise rotation of the lever piece (32) as indicated by the curved arrow in FIG. 2. Thus, the shaft (22) is rotated to unlocking position, whereupon the reclining device (18) is unlocked to thereby allow the seat back frame (14) or seat back (26) to be inclined forwardly and backwardly to a desired inclination angle with respect to the seat cushion (30).

It is seen that the angularly movable stabilizer link mechanism (12) is of a four-point articulation link structure wherein the four pivotal points (at P1, P2, P3 and P4) are provided, and that the second and fourth pivotal points (at P2 and P4) are normally retained on the same level at the side of seat cushion frame (20), whereas the first and third pivotal points (at P1 and P3) are normally retained on the same level at the side of seat back frame (14) via the horizontally extending connecting lever member (44) and the above-described slide elements (at 40 and 48a).

By virtue of such four-point articulated link structure, it is to be appreciated that:—

Figure 3:
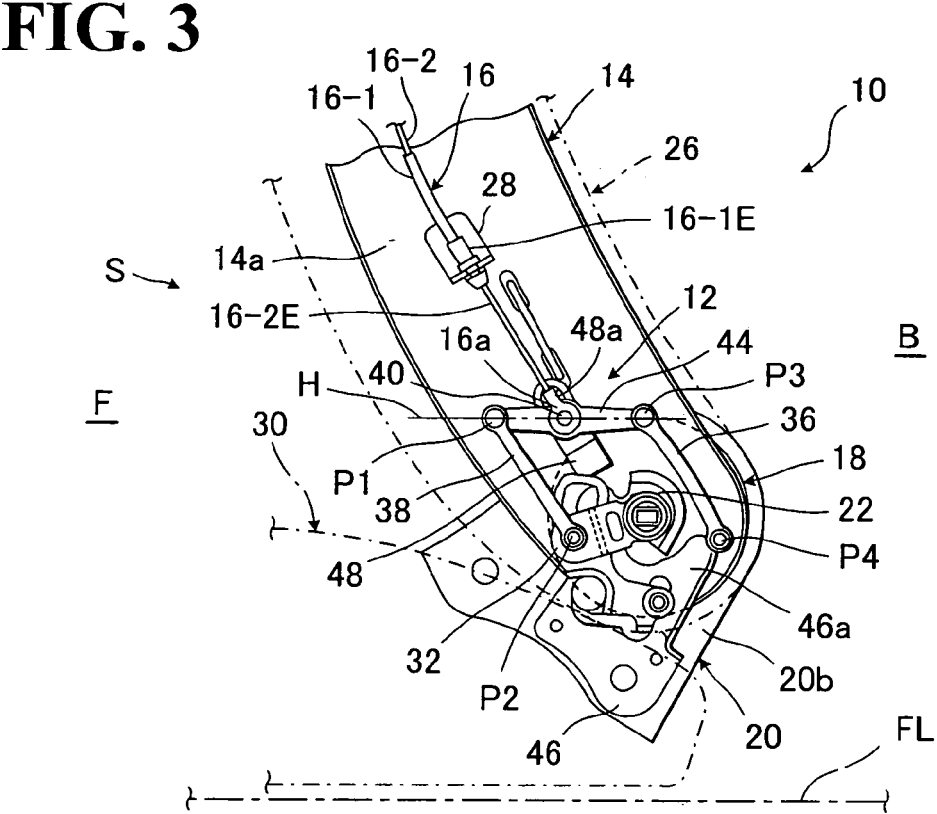
FIG. 3 is a partly broken schematic front view of the unlocking mechanism of reclining device, which shows the case where a seat back is inclined forwardly and particularly shows a stable horizontal state of a horizontal connecting link member, irrespective of such forward inclination of the seat back.

(i) As seen in FIG. 3, when the seat back frame (14) or seat back (26) is inclined forwardly and stopped at a given angle by operation of the reclining device (18), both actuator and support link members (38) (36) are also inclined forwardly and stopped at an angle substantially equal to such given forward inclination angle, such that the longitudinal body of connecting link member (44) is retained by those two link members (38) (36) in a horizontal state extending along the horizontal line (H) in a substantially parallel relation with the floor (FL). Namely, at this point, the connecting link member (44) is positively retained at a fixed horizontal position as indicated by the designation (H), irrespective of the forward inclination of seat back (26). Under that state, upon operation of the remote lock control device (D), as understandable from FIG. 2, the wire cable (16-2) is drawn upwardly, and therefore the connecting link member (44) is rotated or inclined clockwise from that horizontal position (at H) relative to the pivotal point (at P3) pivotally connected with the upper end of support link member (36). With such clockwise rotation of the connecting link member (44), the actuator link member (38) is simultaneously displaced upwardly, thereby causing simultaneous clockwise rotation of the lever piece (32) as indicated by the curved arrow in FIG. 2, whereupon the reclining device (18) is unlocked, irrespective of the forwardly inclined state of the seat back (26).

Figure 4:
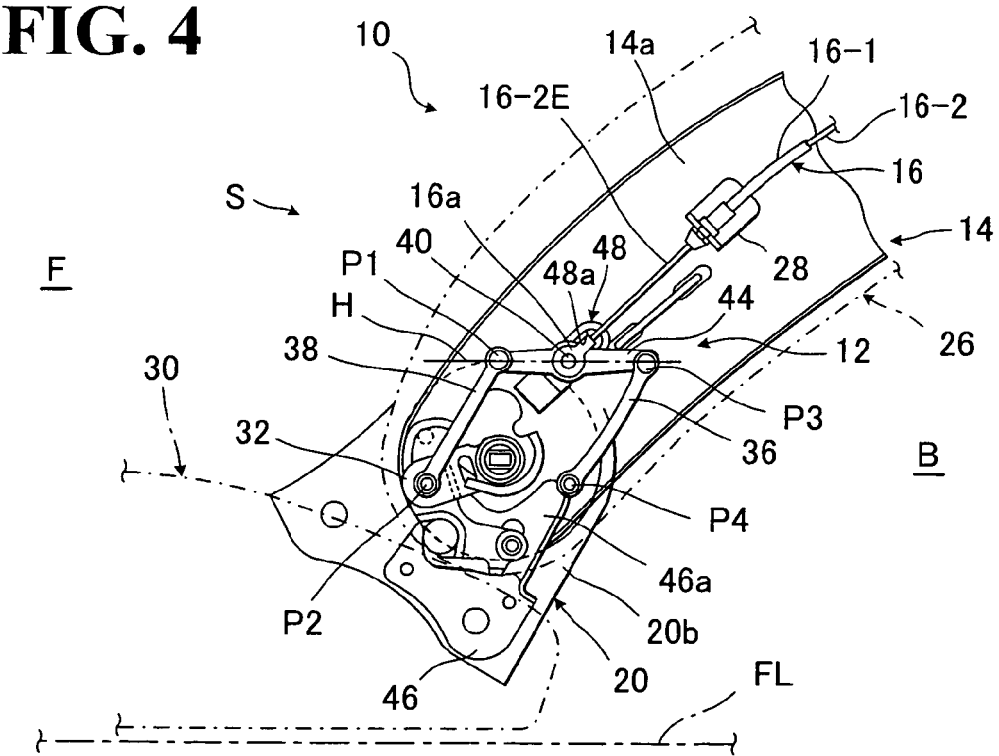
FIG. 4 is a partly broken schematic front view of the unlocking mechanism of reclining device, which shows the case where a seat back is inclined backwardly and particularly shows a stable horizontal state of a horizontal connecting link member, irrespective of such backward inclination of the seat back.

(ii) Conversely, as seen in FIG. 4, when the seat back frame (14) or seat back (26) is inclined backwardly and stopped at a given angle of backward inclination, both actuator and support link members (38) (36) are also inclined backwardly and stopped at an angle substantially equal to such given backward inclination angle, such that the longitudinal body of connecting link member (44) is retained by those two link members (38) (36) in a horizontal state extending along the horizontal line (H) in a substantially parallel relation with the floor (FL). Namely, at this point, the connecting link member (44) is positively retained at a fixed horizontal position as indicated by the designation (H), irrespective of the backward inclination of seat back (26). Under that state, upon operation of the remote lock control device (D), as understandable from FIG. 2, the wire cable (16-2) is drawn upwardly, and therefore the connecting link member (44) is rotated or inclined clockwise from the horizontal position (at H) relative to the pivotal point (at P3). With such clockwise rotation of the connecting link member (44), the actuator link member (38) is simultaneously displaced upwardly to cause simultaneous clockwise rotation of the lever piece (32) as indicated by the curved arrow in FIG. 2, whereupon the reclining device (18) is unlocked, irrespective of the backwardly inclined state of the seat back (26).

Accordingly, in accordance with the present invention, the above-constructed angularly movable stabilizer link mechanism (12) has the following effects and advantages:

(i) All the constituent elements (40, 48, 44, 38, 36 and 32) have a direct movable connection among them via the four pivotal points (at P1, P2, P3 and P4) without any loss of transmission caused therethrough. Therefore, irrespective of forward and backward inclination of the seat back (26), an operation force given from the remotely located lock control device (D) is assuredly transmitted direct to the reclining device (18) without any loss of transmission.

(ii) The angularly movable stabilizer link mechanism (12) is quite simple in structure and further compact and thin in its cross-section, such that it is installed within the width of the side frame member (14a) of seat cushion frame (14), while extending flat adjacently along the vertical flat surface of the side frame member (14a). Thus, outward projection of such link mechanism (12) in a direction laterally of the seat back (26) is effectively minimized to a degree enough to prevent adverse affect to a cushiony touch of adjacent padding layers of the seat back (26).

While having described the present invention, it is should be understood that the invention is not limited to the illustrated embodiment, but any modification, replacement and addition may be applied thereto without departing from the scope of the appended claims.

What is claimed is:

1. An unlocking mechanism of reclining device in combination with a seat and a remote lock control device operable for unlocking said reclining device, wherein said seat includes a seat cushion and a seat back, wherein said reclining device is operatively provided between said seat cushion and said seat back to allow for inclination of the seat back with respect to the seat cushion, said reclining device having a shaft rotatable in an unlocking direction to release the reclining device from a locked state, and wherein said remote lock control device is disposed at a top region of said seat back and includes a wire cable means through which operation force of said remote lock control device is to be transmitted towards said reclining device, said wire cable means having an end, said unlocking mechanism comprising:
an angularly movable stabilizer link mechanism of a four-point articulation link structure having four pivotal points therein, which is movable angularly relative to said shaft of said reclining device in conjunction with said inclination of said seat back so as to stably maintain a fixed transmission passage for allowing said operation force from said remote lock control device to be directly transmitted therethrough to said shaft, irrespective of said inclination of said seat back; and
a lever piece fixed to said shaft,
wherein said angularly movable stabilizer link mechanism essentially consists of:
a first link element having one end, another end, and a central portion defined between said one and another ends;
a guide means for guiding said first link element in a vertical direction of said seat back, said guide means being fixedly connected with a part of said seat back, while being pivotally connected with said central portion of said first link element as well as with said end of said wire cable means;
a second link element having: one end pivotally connected with said one end of said first link element, thus forming a first pivotal point of said four pivotal points; and another end pivotally connected with said lever piece, thus forming a second pivotal point of said four pivotal points; and
a third link element having: one end pivotally connected with said another end of said first link element, thus forming a third pivotal point of said four pivotal points; and another end pivotally connected with a part of said seat cushion, thus forming a fourth pivotal point of said four pivotal points,
wherein said first link element is movable angularly relative to said shaft of said reclining device in conjunction with inclination of said seat back, while being retained at a fixed horizontal position by said second and third link elements, and wherein operation of said remote control device causes upward movement of said wire cable means, thereby causing rotation of said first link element relative to said third pivotal point in a direction away from said fixed horizontal position, which in turn causes rotation of said shaft via said lever piece to unlock said reclining device, irrespective of said inclination of said seat back.

2. The unlocking mechanism as claimed in claim 1, wherein said wire cable means comprises a sheathed wire cable comprising a sheath member and a wire cable slidably extending in and through said sheath member, wherein one end of said wire cable is fixed to said remote lock control device, while another end of said wire cable corresponds to said end of said wire cable means, wherein said guide means includes an elongated hole and a guide pin slidably fitted in said elongated hole, and wherein said central portion of said first link element and said another end of said wire cable are pivotally connected with said guide pin.

3. An unlocking mechanism of reclining device in combination with a seat and a remote lock control device operable for unlocking said reclining device, wherein said seat includes a seat cushion and a seat back, wherein said seat back has a seat back frame provided therein, said seat back frame including at least one side frame member having a width extending in a direction forwardly and backwardly of said seat, wherein said reclining device is operatively provided between said seat cushion and said seat back to allow for inclination of the seat back with respect to the seat cushion, said reclining device having a shaft rotatable in an unlocking direction to release the reclining device from a locked state, and wherein said remote lock control device is disposed at a top region of said seat back and includes a wire cable means through which operation force of said remote lock control device is to be transmitted towards said reclining device, said wire cable means having an end, said unlocking mechanism comprising:

an angularly movable stabilizer link mechanism of a four-point articulated link structure having four pivotal points therein, which is movable angularly relative to said shaft of said reclining device in conjunction with said inclination of said seat back so as to stably maintain a fixed transmission passage for allowing said operation force from said remote lock control device to be directly transmitted therethrough to said shaft, irrespective of said inclination of said seat back; and a lever piece fixed to said driving shaft, said lever piece being formed from a plate material;

wherein said angularly movable stabilizer link mechanism is disposed within said width of said at least one side frame member of said seat cushion frame and consists essentially of:

a first link element having one end, another end, and a central portion defined between said one and another ends, said first link element being formed from a plate material and having a whole length smaller than said width of said at least one side frame member;

a guide means for guiding said first link element in a vertical direction of said seat back, said guide means being fixedly connected with said at least one side frame member, while being pivotally connected with said central portion of said first link element as well as with said end of said wire cable means;

a second link element formed from a plate material, said second link element having: one end pivotally connected with said one end of said first link element, thus forming a first pivotal point of said four pivotal points; and another end pivotally connected with said lever piece, thus forming a second pivotal point of said four pivotal points;

wherein said second link element is disposed within said width of said at least one side frame member and also extends adjacent to and along said at least one side frame member, a third link element formed from a plate material, said third link element having: one end pivotally connected with said another end of said first link element, thus forming a third pivotal point of said four pivotal points; and another end pivotally connected with a part of said seat cushion, thus forming a fourth pivotal point of said four pivotal points, wherein said third link element is disposed within said width of said at least one side frame member and also extends adjacent to and along said at least one side frame member, said first link element being retained at a fixed horizontal position by said second and third link elements so as to extend adjacent to and along said at least one side frame member of said seat back frame, with such an arrangement that said first link element is movable angularly relative to said shaft in conjunction with inclination of said seat cushion, while being retained at a fixed horizontal position by said second and third link elements, and wherein operation of said remote control device causes upward movement of said wire cable means, thereby causing rotation of said first link element relative to said third pivotal point in a direction away from said fixed horizontal position, which in turn causes rotation of said shaft via said lever piece to unlock said reclining device, irrespective of said inclination of said seat back.

4. The unlocking mechanism as claimed in claim 3, wherein said wire cable means comprises a sheathed wire cable comprising a sheath member and a wire cable slidably extending in and through said sheath member, wherein one end of said wire cable is fixed to said remote lock control device, while another end of said wire cable corresponds to said end of said wire cable means, wherein said guide means includes an elongated hole and a guide pin slidably fitted in said elongated hole, and wherein said central portion of said first link element and said another end of said wire cable are pivotally connected with said guide pin.

* * * * *